United States Patent
Chung

(10) Patent No.: US 8,145,729 B2
(45) Date of Patent: *Mar. 27, 2012

(54) READ-ONLY STORAGE DEVICE HAVING NETWORK INTERFACE, A SYSTEM INCLUDING THE DEVICE, AND A METHOD OF DISTRIBUTING FILES OVER A NETWORK

(76) Inventor: Keicy K. Chung, Torrance, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 12/186,120

(22) Filed: Aug. 5, 2008

(65) Prior Publication Data

US 2008/0294753 A1 Nov. 27, 2008

Related U.S. Application Data

(63) Continuation of application No. 10/017,923, filed on Oct. 30, 2001, now Pat. No. 7,444,393.

(51) Int. Cl.
*G06F 15/16* (2006.01)
(52) U.S. Cl. ........ 709/219; 709/203; 709/212; 709/222; 709/226; 709/229; 711/111; 711/112; 711/113; 711/114; 711/118
(58) Field of Classification Search ................... 709/219
See application file for complete search history.

(56) References Cited

U.S. PATENT DOCUMENTS

| | | |
|---|---|---|
| 5,313,631 A | 5/1994 | Kao |
| 5,457,796 A | 10/1995 | Thompson |
| 5,628,005 A * | 5/1997 | Hurvig ................................. 1/1 |
| 5,636,359 A | 6/1997 | Beardsley et al. |
| 5,644,782 A | 7/1997 | Yeates et al. |
| 5,740,370 A | 4/1998 | Battersby et al. |
| 5,751,995 A | 5/1998 | Sarangdhar |

(Continued)

FOREIGN PATENT DOCUMENTS

EP 0 515 073 11/1992

(Continued)

OTHER PUBLICATIONS

Maekawa et al., Distributed Operating System, Japan, 258-2614, Brent Callaghan, NFS Bible, Japan, ASCII Inc., Kenichi Suzuki, Oct. 1, 2001, First Edition, pp. 346-348.

*Primary Examiner* — Thuha T. Nguyen
*Assistant Examiner* — Arvin Eskandarnia
(74) *Attorney, Agent, or Firm* — Connolly Bove Lodge & Huntz LLP

(57) ABSTRACT

A Read-only storage device having network interface, a system including the device, and a method of distributing files over a network. The storage device comprises a processor communicably connected to a computer interface, a network interface, and a storage means. The processor communicates with a computer and a file server through the computer interface and the network interface, respectively. The computer may request a file from the processor and the processor responds by either (1) providing the requested file to the computer on a read-only basis if the file is cached on the storage means, (2) obtains the file from the file server if the file is available from the file server, caches the obtained file on the storage means, and provides the obtained file to the computer on a read-only basis, or (3) returns a file unavailable notice to the computer.

12 Claims, 9 Drawing Sheets

U.S. PATENT DOCUMENTS

| | | | |
|---|---|---|---|
| 5,790,848 A | 8/1998 | Wlaschin | |
| 5,802,299 A | 9/1998 | Logan et al. | |
| 5,806,074 A | 9/1998 | Souder et al. | |
| 5,808,809 A | 9/1998 | Yahagi et al. | |
| 5,829,012 A | 10/1998 | Marlan et al. | |
| 5,832,263 A | 11/1998 | Hansen et al. | |
| 5,873,118 A | 2/1999 | Letwin | |
| 5,881,229 A | 3/1999 | Singh et al. | |
| 5,901,327 A | 5/1999 | Ofek | |
| 5,915,094 A | 6/1999 | Kouloheris et al. | |
| 5,935,207 A | 8/1999 | Logue et al. | |
| 5,956,716 A | 9/1999 | Kenner et al. | |
| 5,978,802 A * | 11/1999 | Hurvig | 710/200 |
| 5,978,841 A | 11/1999 | Berger | |
| 5,987,571 A | 11/1999 | Shibata et al. | |
| 5,996,022 A | 11/1999 | Krueger et al. | |
| 6,006,299 A | 12/1999 | Wang et al. | |
| 6,061,731 A | 5/2000 | Blakeslee | |
| 6,061,740 A | 5/2000 | Ferguson et al. | |
| 6,065,099 A | 5/2000 | Clark et al. | |
| 6,088,694 A | 7/2000 | Burns et al. | |
| 6,134,583 A | 10/2000 | Herriot | |
| 6,148,298 A | 11/2000 | LaStrange et al. | |
| 6,167,490 A | 12/2000 | Levy et al. | |
| 6,199,166 B1 * | 3/2001 | Lanzy et al. | 726/5 |
| 6,263,402 B1 | 7/2001 | Ronstrom et al. | |
| 6,275,953 B1 | 8/2001 | Vahalia et al. | |
| 6,292,852 B1 | 9/2001 | Bodo et al. | |
| 6,327,614 B1 | 12/2001 | Asano et al. | |
| 6,366,947 B1 | 4/2002 | Kavner | |
| 6,377,991 B1 | 4/2002 | Smith et al. | |
| 6,434,548 B1 | 8/2002 | Emens et al. | |
| 6,442,601 B1 | 8/2002 | Gampper et al. | |
| 6,442,651 B2 | 8/2002 | Crow et al. | |
| 6,553,411 B1 | 4/2003 | Dias et al. | |
| 6,623,529 B1 | 9/2003 | Lakritz | |
| 6,651,141 B2 | 11/2003 | Adrangi | |
| 6,675,212 B1 * | 1/2004 | Greenwood | 709/224 |
| 6,701,415 B1 | 3/2004 | Hendren, III | |
| 6,721,780 B1 | 4/2004 | Kasriel et al. | |
| 6,732,237 B1 | 5/2004 | Jacobs et al. | |
| 6,745,295 B2 | 6/2004 | Rodriguez | |
| 6,775,695 B1 * | 8/2004 | Sarukkai | 709/219 |
| 6,816,891 B1 * | 11/2004 | Vahalia et al. | 709/214 |
| 7,047,485 B1 | 5/2006 | Klein et al. | |
| 7,069,351 B2 | 6/2006 | Chung | |
| 2002/0002603 A1 | 1/2002 | Vange | |
| 2002/0073167 A1 | 6/2002 | Powell et al. | |
| 2002/0107935 A1 | 8/2002 | Lowery et al. | |
| 2002/0110084 A1 | 8/2002 | Butt et al. | |
| 2002/0178341 A1 | 11/2002 | Frank | |
| 2003/0028731 A1 | 2/2003 | Spiers et al. | |
| 2004/0049598 A1 | 3/2004 | Tucker et al. | |
| 2004/0172495 A1 | 9/2004 | Gut et al. | |
| 2004/0243727 A1 | 12/2004 | Chung | |
| 2004/0267902 A1 | 12/2004 | Yang | |

FOREIGN PATENT DOCUMENTS

| | | |
|---|---|---|
| JP | Hei-11-355357 | 12/1999 |
| JP | 2001-86168 A | 3/2001 |

* cited by examiner

READ-ONLY STORAGE DEVICE HAVING NETWORK INTERFACE, A SYSTEM INCLUDING THE DEVICE, AND A METHOD OF DISTRIBUTING FILES OVER A NETWORK

PRIORITY

Priority is claimed as a continuation application to U.S. patent application Ser. No. 10/017,923, filed Oct. 30, 2001 now U.S. Pat. No. 7,444,393. The disclosure of the aforementioned priority document is incorporated herein by reference in its entirety.

BACKGROUND OF THE INVENTION

1. Field of the Invention

The field of the present invention is computing devices for use in combination with a network and methods of using such devices.

2. Background

A typical computer, whether an off-the-shelf or a customized computer for personal, business, specialty, or other use, has many components. Some of the common components are processors, memories, storage devices, input and output devices, and network interfaces. The operating system, such as Microsoft Windows®, Mac OS®, UNIX, Linux, etc., is responsible for controlling the components and their functions. In particular, the operating system handles file requests from applications or from the operating system itself. When a file request is received, the operating system attempts to supply the file from one of the local storage devices or from a network server if the computer is connected to a network.

Because there are many different options available for storage devices and network interfaces, the operating system is typically programmed with the characteristics necessary to access almost every storage device and network interface that could be connected to the computer. Thus, for each storage device, the operating system has to be programmed with the storage device type (i.e. magnetic, optical, etc.), the interface type (i.e. IDE, SCSI, etc.), and the physical parameters of the storage device (i.e. number of cylinders, sectors, heads, tracks, etc.). If the computer is connected to a network, the operating system also has to be programmed with the various network interface types (i.e. Ethernet, Token Ring, ATM, etc.), the network protocols (i.e. TCP/IP, IPX, AppleTalk, SNA, etc.), and any particular methods used to communicate with network resources (i.e. servers).

In addition, the operating system also has to be able to manage files on storage devices and over a network. On local storage devices, the operating system typically uses lookup tables or indices, usually referred as file allocation tables, to manage the files. Over the network, the operating system has to be programmed to communicate with a network server and retrieve files. It is often advantageous for the operating system to translate the file information received from the network into a format resembling the file allocation tables to simplify the file retrieval process.

The way an operating system manages components and their functions add complexity to a computer. The complexity is easily seen during the setup process of a computer. Typically, a computer goes through a setup process that would involve (a) booting from a bootable device that can initiate the installation of an operating system, (b) partitioning and formatting local storage devices, (c) installing the full operating system, (d) configuring hardware components such as display cards and network interface, (e) installing and configuring applications, etc., until the computer is prepared for everyday general use.

The complexity is also evident while the computer is in use. Applications and the operating system may require periodic patches or updates, the installation of which frequently involves uninstalling the older versions of the applications or the components of the operating system. Additionally, files may be corrupted due to program errors, user errors, or computer viruses. When this happens, the corrupted files need to be replaced or repaired, a process that may involve reinstalling the applications that use the corrupted files or even possibly reinstalling the operating system itself in some instances.

The complexity involved in using a computer usually results in high maintenance and support costs being incurred. In a business environment, the support costs can easily reach thousands of dollars per user or per computing device. Additionally, the cost of maintaining computers increases because work productivity tends to decrease significantly, often to zero, when computer related problems arise.

Problems related to hardware malfunction, except problems related to storage devices, may often be resolved within a short amount of time. For instance, a broken component, such as a video card or a network interface card, may be quickly replaced with an identical component. However, computer repair may become a lengthy process if the problems are related to storage devices or the files stored on the storage devices. When a hard drive in a computer malfunctions or corrupted files cause problems, the repair and recovery process might involve reinitializing the hard drive, reinstalling the operating system, and/or reinstalling applications.

Numerous methods are presently available to reduce the complexity of computers, shorten the recovery process when problems occur, or to minimize the need for a recovery process altogether. Some of the common methods are cloning the storage device, booting the computer from a network, utilizing specialized computer management software, and applying file level security.

By cloning the storage device, the installation process may be shortened. A computer is first completely set up with a full set of applications. Then the storage device is cloned or duplicated as an "image" file. The image file may then be used to reset the computer to its original condition or to set up identically equipped computers. Many consumer-oriented computers come with recovery CD ROM's containing the factory default image that can be used to restore the storage device to its factory default condition. The drawback of this method is that a new image of the storage device has to be created whenever there is a change in the operating system, applications, or any other files stored on the storage device. Complications may arise using this method in instances when it is necessary to apply patches or updates to the installed software after the storage device is restored from an old image.

The network boot method is often used in conjunction with simple computers that download necessary files from a network server. The computer usually uses a well-know network service, such as BOOTP, TFTP, or PXE, to download and execute a small basic portion of an operating system, which in turn can start downloading the rest of the operating system and any applications. The drawback of this method is that if the computer does not have a local storage device, it has to go through the same boot process of downloading needed files whenever it is powered on or reset. If the computer has a local storage device, this process can benefit by storing downloaded files locally. But then the operating system downloaded over the network is, once again, responsible for the often complex task of managing hardware components and files stored on the local storage device.

The computer management software method is used to enhance the operating system by adding additional software components as agents, daemons, or services. One typical way of using this method is to use anti-virus software that constantly scans stored files for any computer virus infection. This method may also be implemented by adding a software component that constantly monitors important files on the local storage device and attempts to self-heal any damaged or corrupted files. An additional implementation adds a software component that handles file updates pushed out from a server as a part of a computer management tool. The drawback of this method is that the software components acting as agents, daemons, or services are highly dependent on the operating system. The operating system has to provide necessary functions, such as managing local storage devices or network interfaces, for these software components to work properly.

Many operating systems can also apply file level or directory level security to provide certain level of protection against computer viruses, unauthorized access, user errors, or application errors that can corrupt important files. The drawback of this method is that it is operating system dependant, and a super user, an administrator, or a process running with full access privileges can accidentally modify, delete, or corrupt important files in the local storage.

The above methods, by themselves or in combination with other methods, provide some help in reducing the complexities involved with computers. However, none of the methods fundamentally changes how the operating system manages the components of a computer. Thus, a new approach is needed for managing computers and simplifying the manner in which files are distributed over a network.

SUMMARY OF THE INVENTION

The present invention is directed to a read-only storage device, a system incorporating the device, and a method of distributing files over a computer network. The storage device comprises a processor communicably connected to a computer interface, a network interface, and a storage means. The computer interface and the network interface allow the processor to communicate with a computer and a file server, respectively, when the storage device is connected to a computer and a file server. The computer may request a file from the processor. When such a request is made, the processor first checks the storage means to determine whether the requested file is cached on the storage means. If the requested file is cached on the storage means, the file is provided to the computer on a read-only basis.

If the requested file is not cached on the storage means, the processor may obtain the requested file from a file server on the network. Provided the requested file is available from the file server, the processor obtains the file, caches the file on the storage means, and provides to the computer on a read-only basis. Once a file is cached on the storage means, the file is available to the computer upon future requests. If the file is not available from the file server, then the processor returns a file unavailable notice to the computer.

The storage device may also receive commands from the file server to delete a file that may have been cached on the storage means. Upon receiving a delete command, the processor will check the storage means for the presence of the file and, if the file is present on the storage means, delete the cached copy of the file.

Accordingly, an improved read-only storage device, a system incorporating the device, and a method of distributing files over a computer network are disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
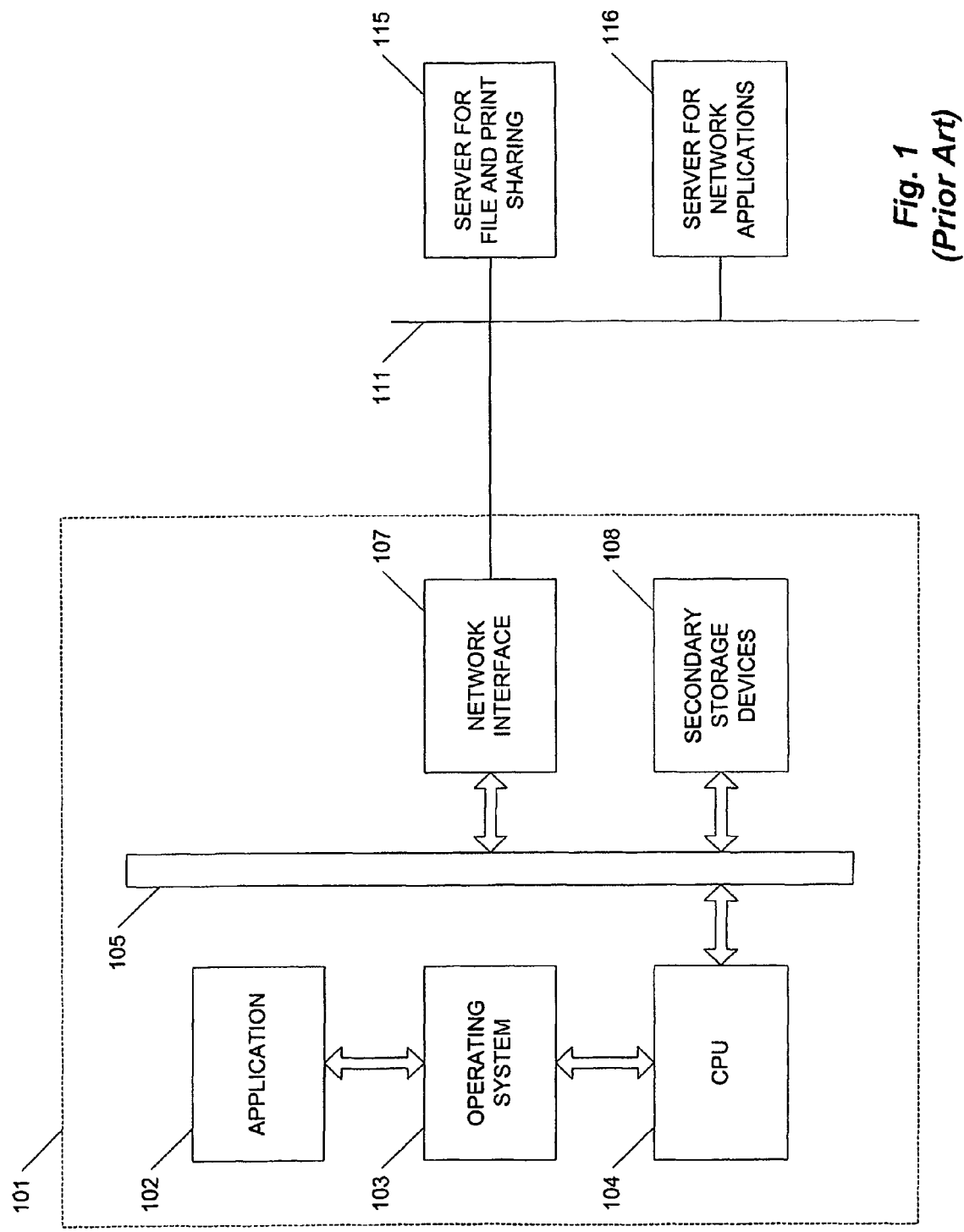
FIG. 1 illustrates a block diagram of a networked computer according to the prior art.

Turning in detail to the drawings, FIG. 1 is representative of a typical networked computer 101 as exhibited in the prior art. As used herein, the networked computer 101 may be a personal or business computer, whether an off-the-shelf or a custom built computer, or it may be a specialty device such as a personal digital assistant, a telephone, or a networked appliance. The computer 101 is shown with common components such as the central processing unit 104, the internal interface bus 105 that connects and allows communication between the various components, the network interface 107 that may be wireless or wired to connect the computer 101 to a network 114 having network resources such as a file and print sharing server 115 and/or a network applications server 116, and a secondary storage device 108, such as a hard drive or non-volatile random access memory, where the operating system 103 and application files 102 are typically stored. These components are common to networked computers and are therefore well known to those skilled in the art.

The operating system 103 is responsible managing the interaction between the components to form a functional computer. In particular, the operating system 103 handles file requests that may originate from applications 102 or from the operating system 103 itself. These file requests arise when the applications 102 or operating system 103 require access to a file which resides on either the secondary storage device 108, the file and print sharing server 115, or the network applications server 116. To handle the file requests, the operating system 103 has to be programmed with the characteristics of numerous storage devices 108 and network interfaces 107 to account for the wide variety of storage devices and network protocols that may be used in conjunction with the computer.

The operating system 103 must also be programmed with information that enables it to keep track of files stored on the secondary storage device 108 and how to integrate into the computer's operation the various resources which are available from the various network servers 115, 116. Therefore, under normal operating circumstances, the operating system 103 of the computer 101 must address many different complex tasks.

Figure 2:
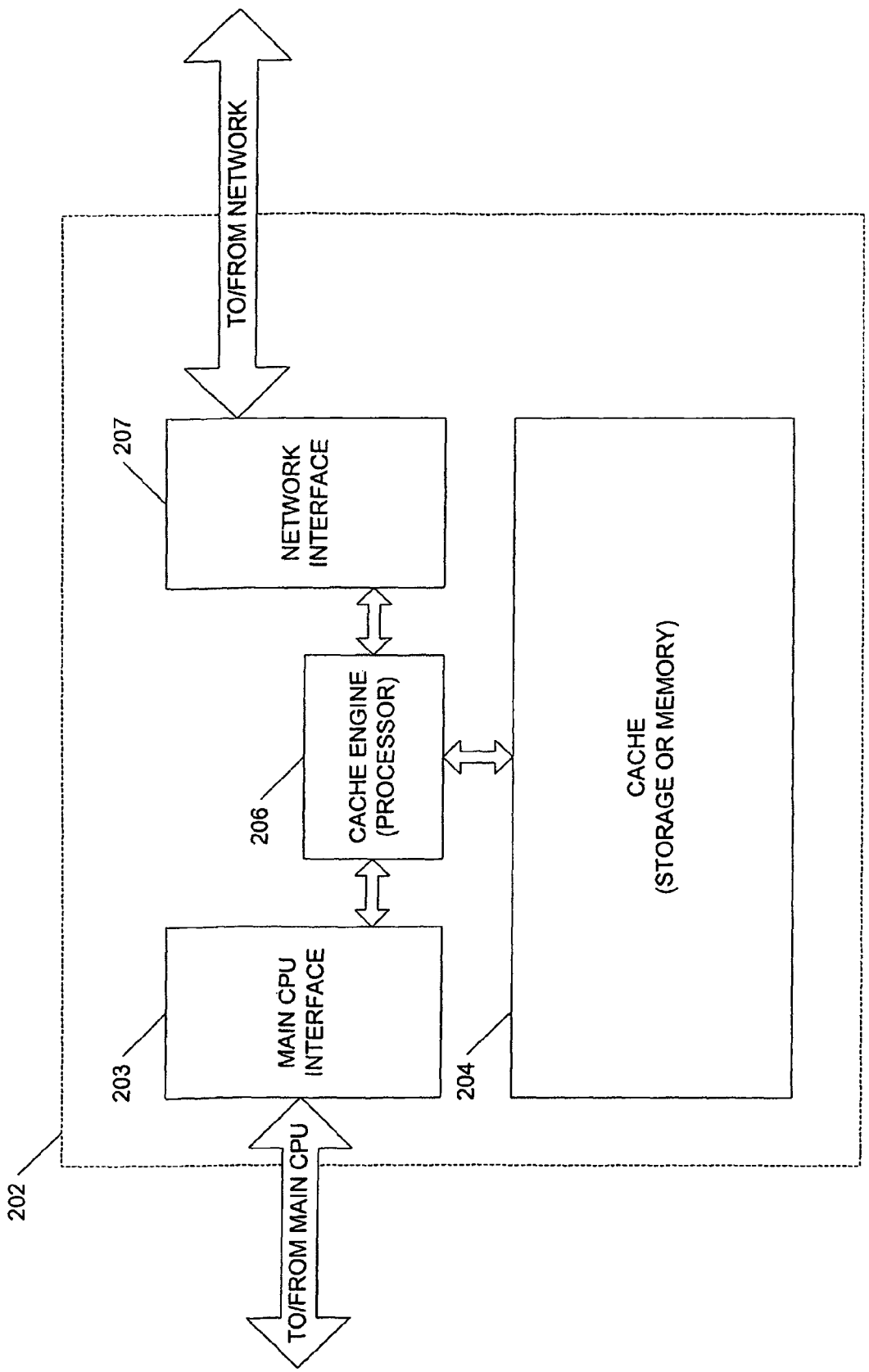
FIG. 2 illustrates a block diagram of a read-only storage device in accordance with a preferred embodiment of the present invention.

FIG. 2 is a block representation of a cache based device (CBD) 202 in accordance with a preferred embodiment of the present invention. The CBD is intended to be used in conjunction with a computer, such as the computer illustrated in FIG. 1, to simplify the tasks required of the operating system when managing the various computer components and the interaction with one or more network servers. The CBD 202 has four basic components: the main computer interface 203 that connects the CBD 202 to a computer, the network interface 207 that connects the CBD 202 to a network, the cache engine (or processor) 206 that manages the components within the CBD 202 and processes file requests from the operating system of the computer, and the cache (or storage means) 204 that the cache engine 206 uses to store files locally.

The cache engine 206 may be any type of central processing unit appropriate to control the functions of the CBD 202 as described herein. The particular type of central processing unit used is a matter of design choice. Acceptable central processing units are available from the integrated circuit divisions of vendors such as ARM, Hewlett-Packard (HP), International Business Machines (IBM), Intel, and Advanced Micro Devices (AMD).

The cache engine 206 is programmed to manage the files stored on the cache 204 and interact with the computer and network as needed. The programming may be in any programming language, such as C++, Java, etc., and the compiled program may be embedded into the cache engine 206 itself, or it may be stored in a separate memory specifically provided for such a purpose. Alternatively, the programming may be stored within the cache 204 for access by the cache engine 206. The programming permits the cache engine 206 to communicate with a computer, giving the computer access to files stored in the cache 204 on a read-only basis. The programming also permits the cache engine 206 to communicate with a network through the network interface 207. Thus, when a computer requests a file from the CBD 202 that is not stored in the cache 204, the cache engine 206 may request the file from a server on the network the CBD 202 is connected to in an attempt to obtain the requested file. If the requested file is found on the network, the cache engine 206 will store the file in the cache 204 and give the computer access to the file on a read-only basis. If the requested file is not available, either within the cache 204 or on the network, the cache engine 206 may provide the computer with a notice that the requested file is unavailable.

The computer interface 203 and the network interface 207 may also be any type of appropriate interface that permits the cache engine 206 to communicate with a computer and a network, respectively. The particular method of interconnecting the computer and the network to the CBD 202 is a matter of design choice. Methods utilizing commonly known formats such as IDE, ATA, SCSI, and IEEE 1394, among others, are acceptable for the computer interface 203. Methods utilizing commonly known network interface types, such as Ethernet, Token Ring, and ATM, among others, and network protocols such as TCPIIP, IPX, AppleTalk, and SNA, among others, are acceptable for the network interface 207. Such components are generally widely available from a variety of computer hardware vendors.

A CBD may thus be operating system independent because the CBD does not have to conform to any particular protocols or file structures. An operating system needs to be programmed only with the protocol needed to request files stored on the CBD because the cache engine, and not the operating system, manages the files stored on a CBD. Thus, communication between the operating system and the CBD may be performed using a small number of procedures. These procedures would be the only ones dependent on the operating system and system architecture, and they can be standardized on any hardware platform.

The particular type of storage used for the cache 204 is also a matter of design choice. The cache 204 may be any type of random access media that is well known to those skilled in the art, such as a hard drive, DRAM, SDRAM, flash memory, and any type of removable random access media. The programming used by the cache engine 206 must be adapted to function with the particular type of random access media chosen.

Figure 3:
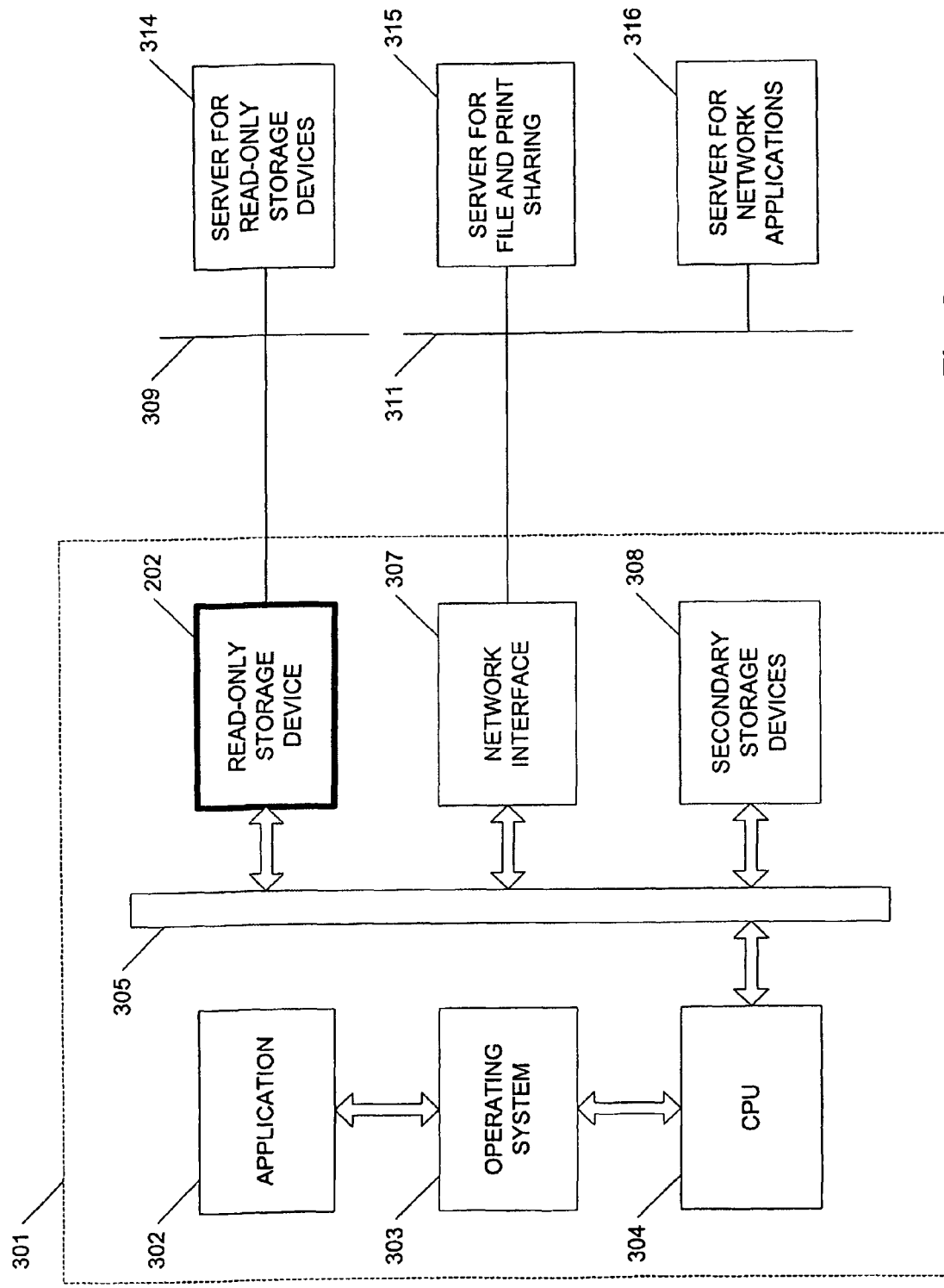
FIG. 3 illustrates a block diagram of the device of FIG. 2 incorporated into a networked computer.

FIG. 3 illustrates a networked computer 301 incorporating a CBD 202 in accordance with a preferred embodiment of the present invention. In the embodiment shown, the CBD 202 is incorporated internally to the computer 301. However, the CBD 202 may also be external to the computer 301 without losing any of the functionality described herein. As in the prior art, the computer includes a CPU 304, an interface bus 305, a secondary storage device 308, and a network interface 307. The operating system 303 integrates the operation of the various components and the applications 302 are executed within the environment created by the operating system 303. The computer 301 is connected to a file and print server 315 and an application server 316 via the network interface 307. The CBD 202 is communicably connected to the computer by connecting the computer interface (not shown in FIG. 3) to the interface bus 305.

The networked computer 301 of FIG. 3 is connected to two separate networks. The first network 309 connects the CBD 202 directly to a CBD file server 314 that serves only the CBD 202. The second network 311 connects the network interface 307 of the computer to a file and print sharing server 315 and a server for network applications 316. The networks may be formed of copper-based wiring, optical fibers, wireless communications, or any other type of networking known to those skilled in the art. Additionally, the first and second networks 309, 311 do not have to be the same type. For example, the first network 309 may be wireless and the second network 311 may be formed of copper-based wiring.

Figure 5:
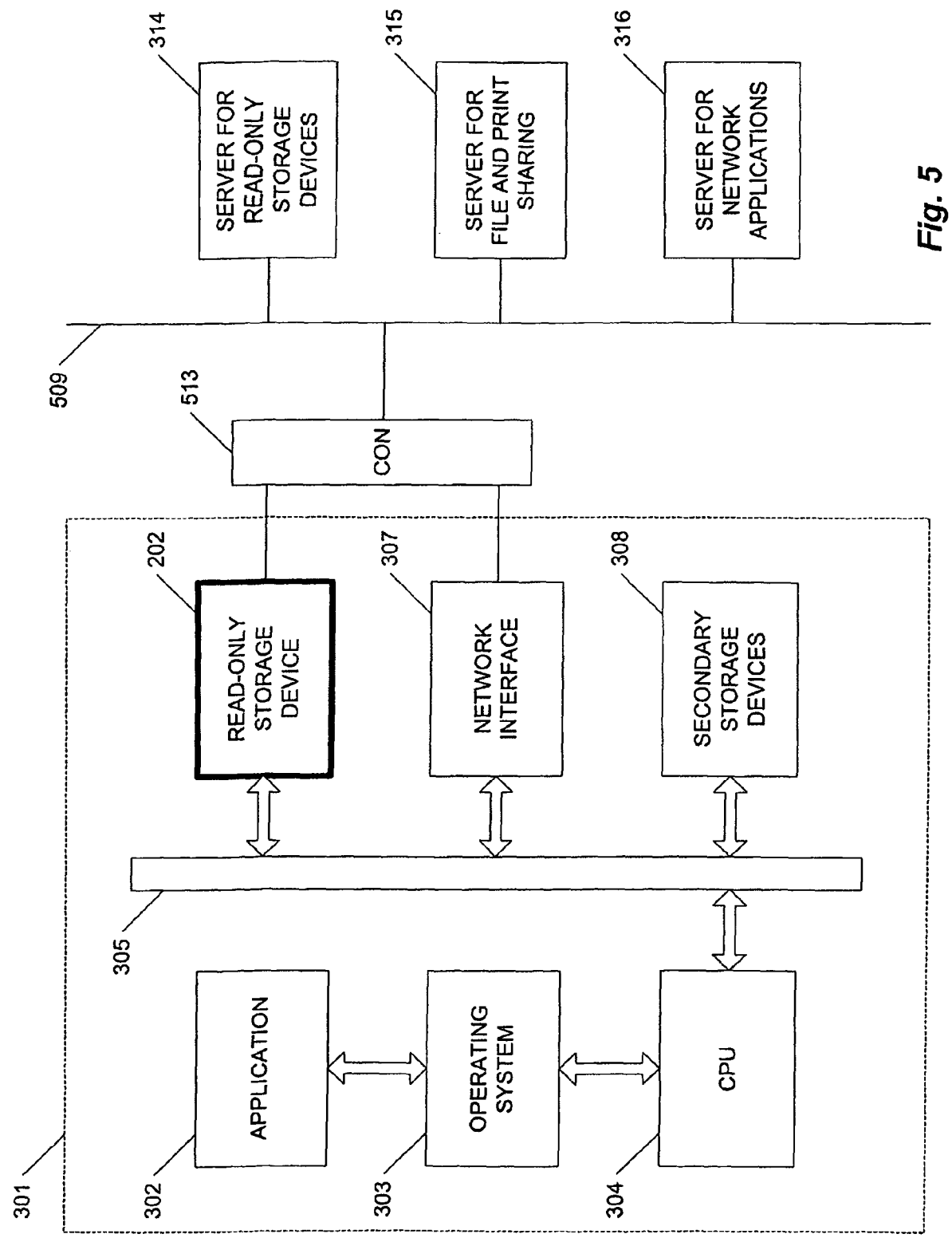
FIG. 5 illustrates a block diagram of the device of FIG. 2 incorporated into a networked computer.

The two networks are preferably independent networks that do not interact. However, the two networks may be merged into a single network, as illustrated in FIG. 5, with a single network connection being shared by the CBD 202 and the network interface 307 through a network concentrator 513. The network concentrator 513 is communicably connected to the network 509 to pass network communications through to the CBD 202 and the network interface 307. Under such circumstances, it is desirable, but not necessary, to have the CBD 202 be the only device type on the network that communicates with the CBD file server 314. In other words, the CBD file server 314 will not communicate with any device other than the CBD 202 and the CBD 202 will not communicate with any server other than the CBD file server 314.

Figure 6:
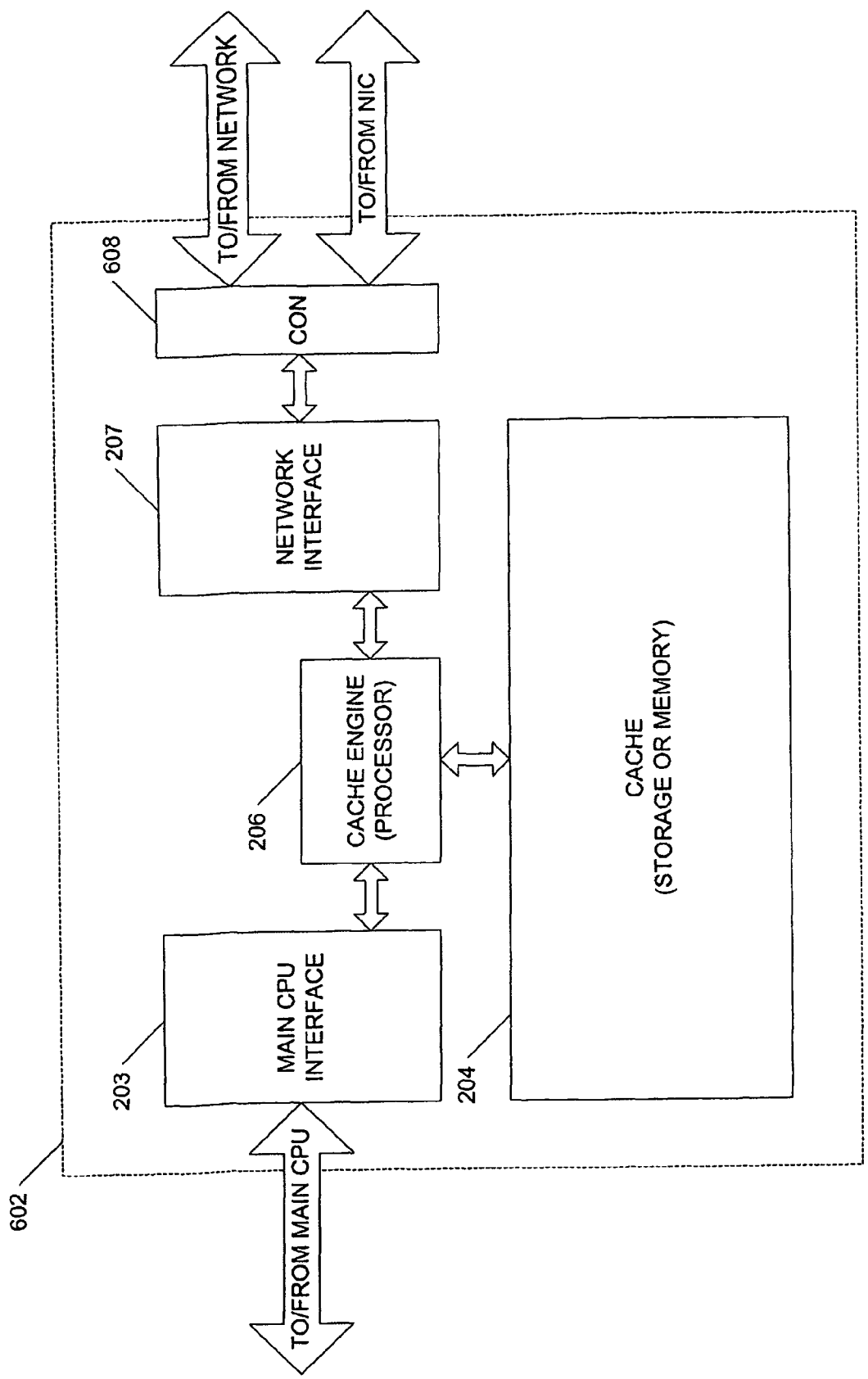
FIG. 6 illustrates a block diagram of a read-only storage device in accordance with a first alternative embodiment of the present invention.

In a first alternative embodiment illustrated in FIG. 6, a network concentrator 608, such as the one previously described, is incorporated into the CBD 602. Such a CBD 602 may be placed into a computer 701 as is illustrated in FIG. 7.

Figure 7:
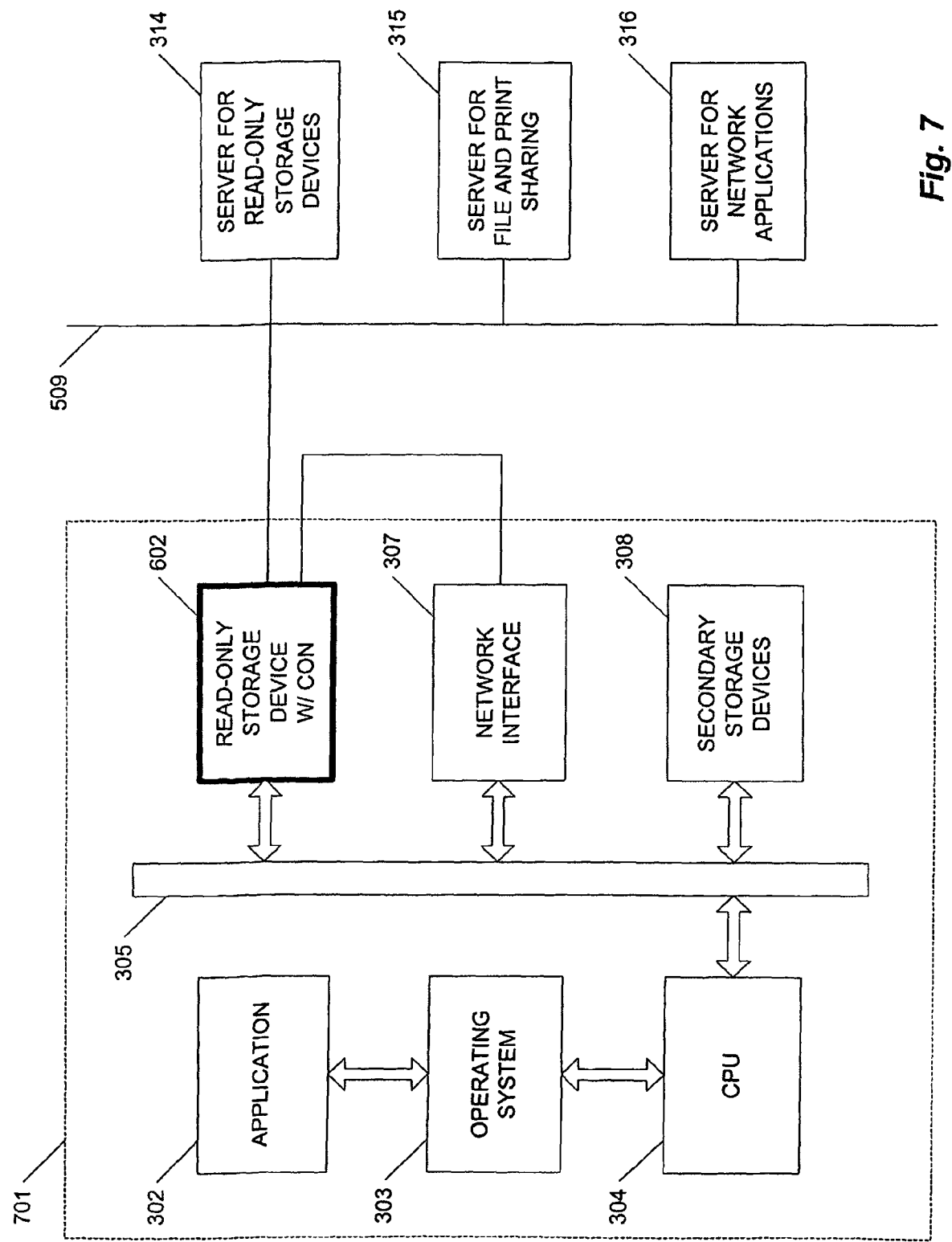
FIG. 7 illustrates a block diagram of the device of FIG. 6 incorporated into a networked computer.

The computer 701 in FIG. 7 has the same components as the computer of FIG. 3. However, the computer 701 is connected to the network 509 through the CBD 602. The CBD file server 314, the file and print sharing server 315, and the network application server 316 are all connected to the single network 509. The CBD 602 is connected to the network 509 by way of the network concentrator 608. The network concentrator 608 is additionally connected to the network interface 307 to pass network communications through to the computer 701. This connection may be formed external to the computer, as is shown, or internal to the computer.

Figure 8:
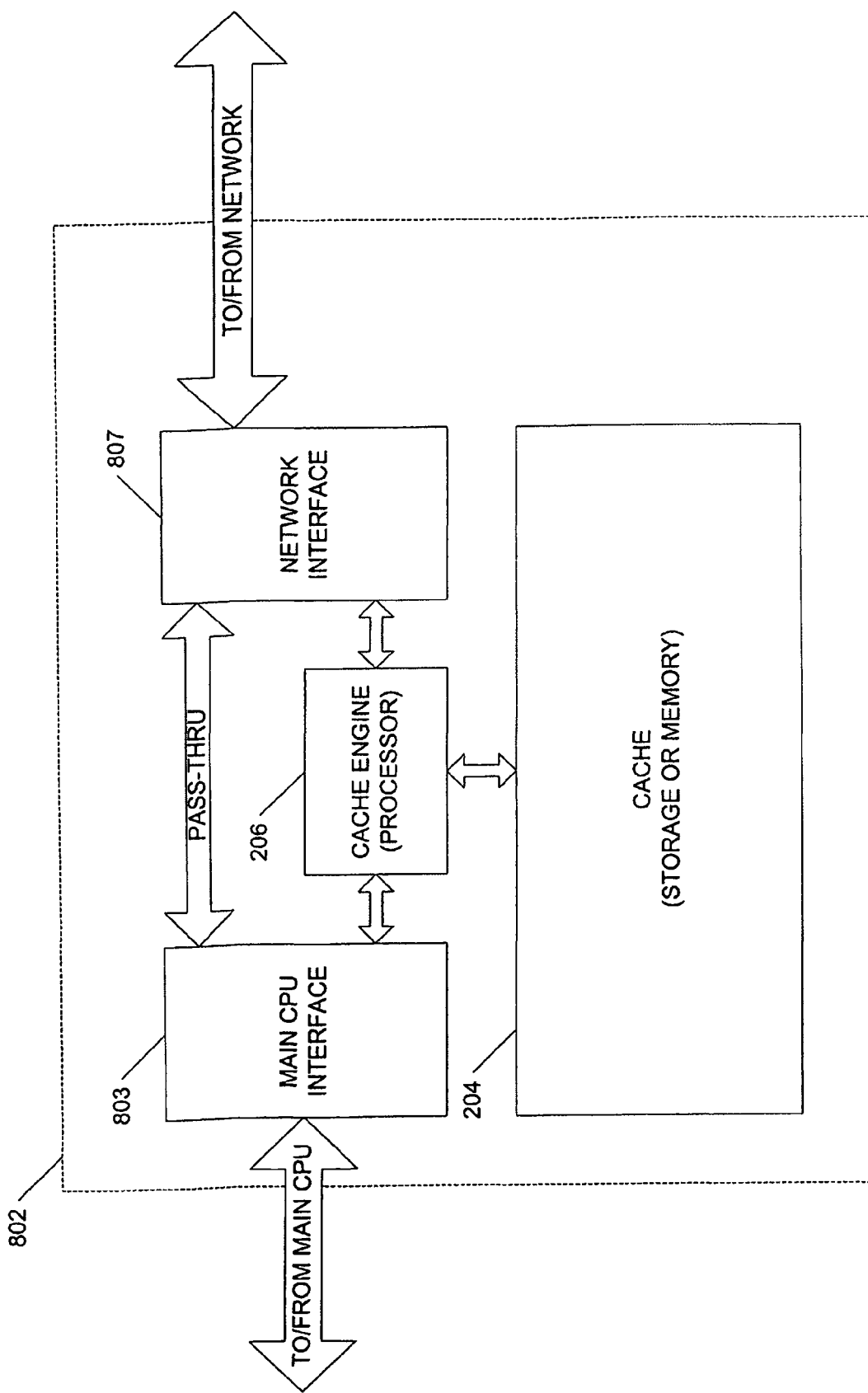
FIG. 8 illustrates a block diagram of a read-only storage device in accordance with a second alternative embodiment of the present invention.
Figure 9:
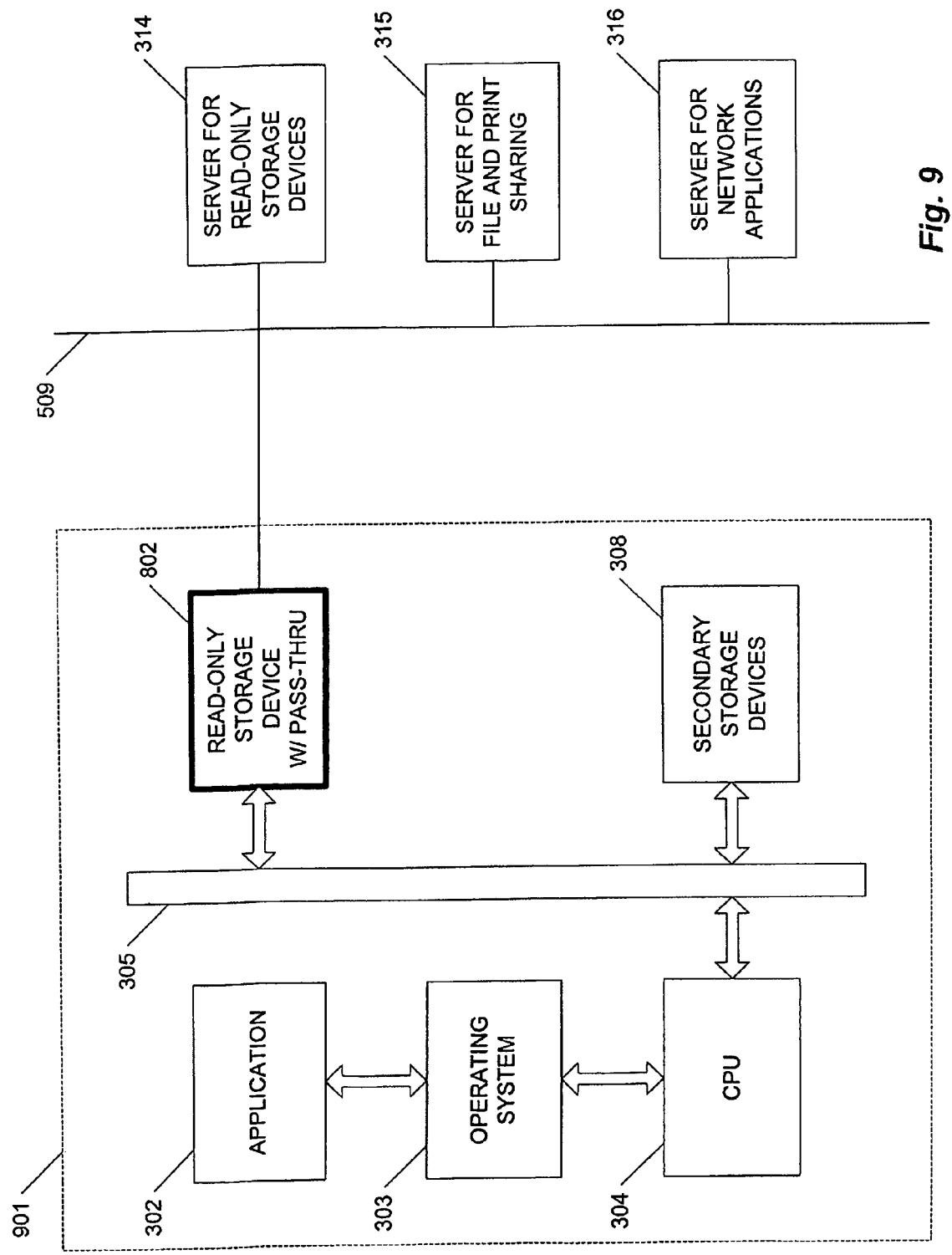
FIG. 9 illustrates a block diagram of the device of FIG. 8 incorporated into a networked computer.

A second alternative embodiment is illustrated in FIG. 8. In this embodiment, the CBD 802 may provide a computer with a network connection without the use of a network concentrator. The network interface 807 of the CBD 802 passes network communications intended for the computer directly to the computer interface 803. Thus, when the CBD 802 is incorporated into a computer 901, as illustrated in FIG. 9, the network communications are passed through the CBD 802 to the internal interface bus 305 of the computer 901. In this configuration, the CBD file server 314, the file and print sharing server 315, and the network application server 316 may all be connected to a single network 509 which provides network communications to both the CBD 802 and the computer 901. Additionally, with the implementation of known encryption techniques for the communications between the CBD 802 and the CBD file server 614, this configuration can be made as desirable as the preferred configuration depicted in FIG. 3.

Figure 4:
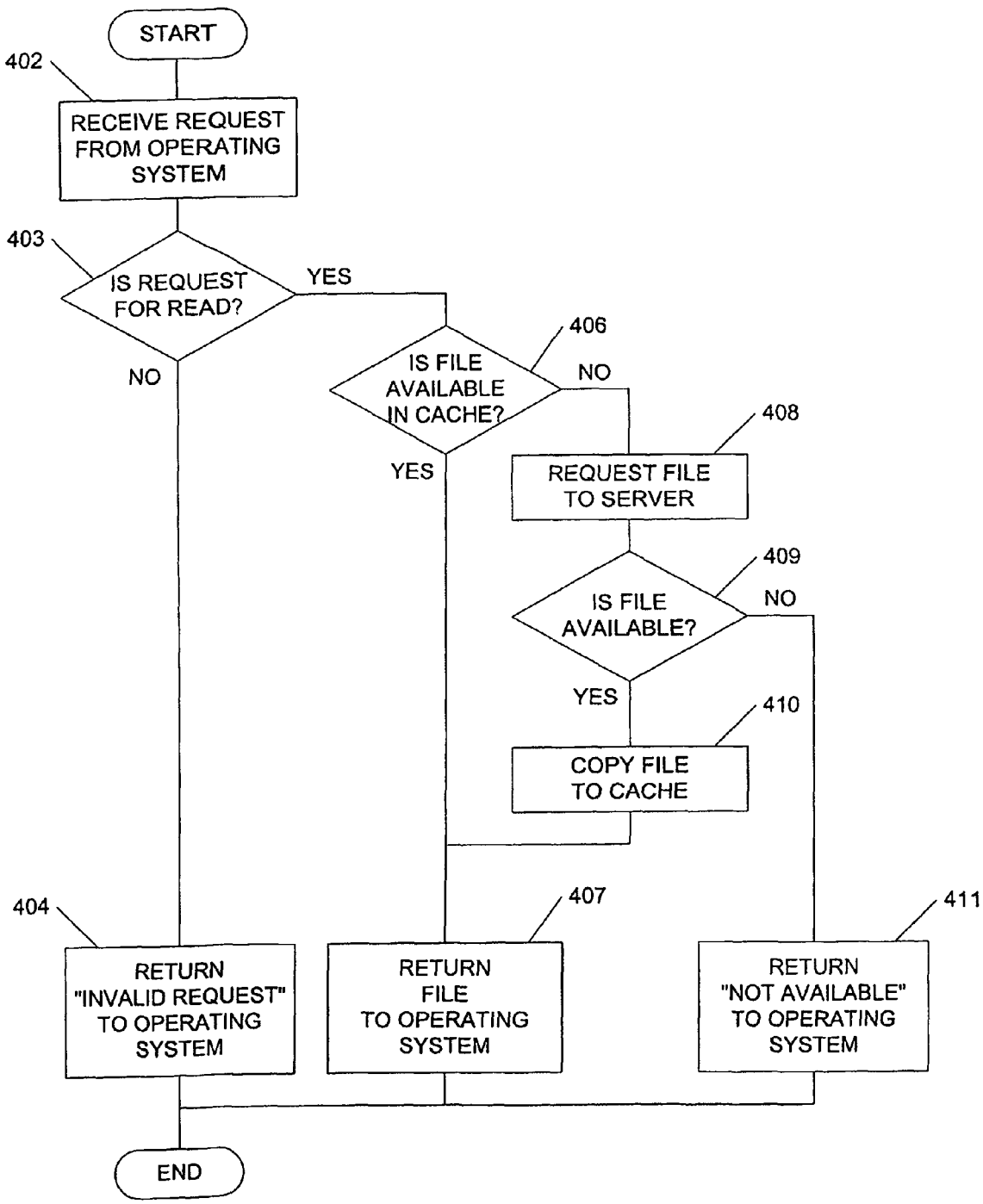
FIG. 4 is a flow chart illustrating an algorithm the device may use in response to a file request from the networked computer of FIG. 3.

FIG. 4 illustrates a flowchart of the preferred logic the cache engine follows in responding to file requests from the operating system. When the cache engine receives a file request 402 from the operating system, it checks whether the request is for a file read 403, as opposed to, for example a file write or file delete. If the request is not for a file read, the cache engine rejects the request 404 by returning an "Invalid Request" notice to the operating system. If the request is for a file read, the cache engine checks the cache 406 to see if the file is available from the cache. If the file is available from the cache, the cache engine returns the file 407 to the operating system. If the file is not available from the cache, the cache engine sends a request 408 for the file to a CBD file server. The request may be in the form of a broadcast to any and all CBD file servers on the network, or the request may be made to a specific CBD file server on the network. The method used depends on the particular network the CBD is connected to. If the file is available from a CBD file server 409, the cache engine copies the file 410 from the CBD server to its local cache and returns the file 407 to the operating system. If the file is not available from a CBD file server, the cache engine notifies the operating system 411 by returning a "File Not Available" notice to the operating system.

In addition to retrieving files from the CBD server at the request of the operating system, the CBD may also be preprogrammed to retrieve and cache files as needed or as instructed by the CBD file server. The files cached on the CBD may be deleted based on one or more criteria, thus forcing the CBD to re-retrieve the file from the CBD server at the next instance the file is needed. File deletions may be forced at the prompting of the CBD server, or certain files may have a file expiration tag associated with the file, thus causing the CBD to delete the file at the time indicated by the file expiration tag. The file expiration tag may indicate an absolute date or time, or a date or time based on an anticipated event.

The following are examples that demonstrate some of the benefits of the present invention:

1. Installation of an Operating System on a Personal Computer

Since today's operating systems for personal computers provide many functions, it is frequently necessary to install an operating system on a local hard drive. During the boot process, a ROM-based BIOS loads the operating system by first reading the bootstrap stored on the hard drive. The bootstrap provides information about the first executable code needed to load the operating system. Based on the information provided by the bootstrap, the BIOS loads the first file into memory and passes control over to the file, which starts loading other files necessary for loading the entire operating system.

On a computer that includes a CBD, the operating system would not need to be installed on a local hard drive prior to the boot process. The BIOS may request from the CBD the first file needed to start loading the operating system. For a new computer, the cache on the CBD would most likely be empty at this point. When the cache engine receives the request for the first file from the computer, the first file is retrieved from the CBD file server. The first file may then be saved to the cache and supplied to the BIOS. The file may then take control of the boot process from the BIOS. File requests may continue to the CBD, with the requested files being retrieved, saved to the cache, and supplied to the requester. Thus, all the files needed to initially load the operating system may be obtained by the CBD from the CBD file server on an as needed basis.

While this process is somewhat similar to a computer booting from the network by well-known processes, such as BOOTP, TFTP, or PXE, the primary benefit of utilizing a CBD becomes apparent when the computer is rebooted. Rebooting a computer that utilizes BOOTP, for example, requires a repeat of the process of downloading files from the network. In contrast, rebooting a computer that includes a CBD does not require downloading all the files from the network again because all the needed files are stored in and supplied from the cache within the CBD. This process also differs from storing the operating system on a local hard drive because, in doing so, the operating system must manage the files on the hard drive In contrast, the operating system running on a computer including a CBD does not manage the files in the CBD cache.

The process is also somewhat similar to a computer booting from locally attached read-only devices, such as a CD-ROM. But the benefit of utilizing a CBD becomes apparent because of the flexibility of a CBD. When a file is needed to be replaced or updated on a CD, either the CD has to be replaced with a new one or techniques similar to those disclosed in U.S. Pat. Nos. 5,832,263 and 5,790,848 must be employed. In contrast, files cached by a CBD may be replaced or updated dynamically by an administrator. The administrator may simply have the CBD file server send a "delete" command to the CBD to delete a particular file. After deleting the file, the next time that file is requested or needed, the file or its updated replacement must be retrieved from the CBD file server. Thus, it is possible for a CBD to always have up-to-date files in its cache.

2. Installation of Applications on a Personal Computer

The process of installing applications is similar to the process of installing the operating system. The operating system may present a list of available applications to the user. When the user selects an application, the operating system requests the necessary files from CBD. Where the application has never been used before, the CBD will retrieve the necessary files from the CBD file server, store the files within the cache, and supply the files to the operating system so that the operating system may load the application.

The speed of accessing an application for the first time in this manner would be comparable to the speed of launching a server-based application (i.e., Microsoft Word® installed on a network server for use by multiple users on the network). The advantage of using a CBD becomes evident when the application is accessed after the first time. Unlike a server-based application that has to be retrieved from a network sever every time it is accessed, the application is cached to the CBD thus allowing the files to be quickly accessed for each subsequent desired use. Additionally, components of an application or an application itself may be dynamically replaced or updated by an administrator by having the CBD file server send a "delete" command to the CBD.

3. Protection of Files Important to the Operating System and Applications

On a typical computer, files stored in a local hard drive are generally subject to accidental deletion, modification, or corruption caused by user errors or computer viruses. Deleted, modified, or corrupted files may lead to application errors, operating system errors, or the computer itself becoming non-functional. Therefore, files important to the operating system and applications should be subject to the highest level of protection.

There are many conventional ways to protect files. In a corporate environment, an administrator may set up a computer and apply file-level securities so that the administrator is the only user having full access (read, write, execute, modify, add, delete, etc.), while a regular user may have only limited access (read and execute, for example). Once applied, maintaining this type of file-level security usually becomes a substantial task of the operating system. The operating system has to maintain a complex list or database to manage files and security. The operating system may also include a self-healing function that attempts to automatically repair files that might be damaged. In addition, antivirus software may be installed to protect the PC from viruses. But, if the file-level security system is somehow compromised, then files on the hard disk are exposed to the risk of being deleted, modified, or corrupted. Additionally, if the antivirus software is not up-to-date, it may not be able to provide proper defense against viruses.

In contrast, a computer with a CBD may fully protect important files against human errors or viruses. Files cached in the CBD can not be deleted, modified, or corrupted by the user or a virus from the computer since the computer has read-only access to the files. In addition, neither an administrator nor the operating system can change files stored in CBD's cache as the CBD will only accept files or updates from the CBD file server. Therefore, a CBD can naturally protect files important to the operating system or applications.

In addition, if the operating system is configured not to load any programs or executable codes from any device other than the CBD, additional protection is provided against unauthorized programs or codes, such as computer viruses, worms, or scripts. The additional protection is inherent with such a system because all files supplied to a computer through a CBD may be verified at the CBD file server as being safe for use.

4. Simplified Software License Inventory and Management

In a corporate environment, managing software licenses and usage is quite complex. Users are initially given PC's with a set of pre-loaded applications that have legal licenses. But users may start installing applications on their own, or they may never use some of the pre-installed applications for which license fees have been paid. Thus managing which software is used by a user, which software is licensed, and which software is not licensed may easily turn into a difficult task.

CBD's may be implemented on a company-wide basis to make the task of managing software and software licenses less difficult. First, a user cannot install an application on a CBD because the CBD is a read-only device. Therefore, software installed on a local hard drive can be easily identified as user installed software. Second, an administrator may easily obtain an accurate count of the applications in use by monitoring the number of times an application is downloaded from the CBD file server. An administrator may at any time obtain an accurate count of applications in use by issuing a "delete" command to delete key components of applications from the CBD's, thus requiring that component to be requested from the CBD file server the next time the application or applications are used. Third, application vendors may implement different licensing models, such as per-use licensing, if CBD's are used because of the ease with which application use may be monitored. A vendor might even gain greater benefits from CBD's configured to access the CBD file server through the internet.

5. Database Applications

Database applications may benefit from use of a CBD. Address book applications or map applications are examples of applications that utilize collections of records organized into databases. These applications often include records that are relatively static but may require periodic updates.

To utilize a CBD in conjunction with a database application, a file containing a lookup table may be provided to the CBD, with each entry in the table representing a record in the database. Initially, the application would obtain the lookup table file from the CBD, the file being requested from the CBD file server if necessary. Each record from the lookup table file that is desired by the user may be retrieved from the CBD file server and cached in the CBD for access by the user. After a period of use, the cache will contain all the records accessed by the user. If any of the records cached by the user need to be updated, the CBD file server may issue a "delete" command, thereby deleting particular records from the cache. The CBD file server may also update the entire lookup table file by issuing an appropriate "delete" command. After a record or the lookup table file has been deleted, the next time a user accesses the database, the CBD will necessarily have to retrieve the updated version of the record or file from the CBD file server.

This method of database management may be advantageously implemented with wireless devices such as cellular phones. Cellular phones frequently store a full list of contact information, but many of the entries may not be used at all. However, because of all the entries, synchronizing the database with a master database on a company server may be time consuming. A cell phone equipped with a CBD, the CBD having a flash memory as its cache, may reduce the time needed to maintain an up-to-date database in the cell phone. Initially, the CBD in the cell phone would download the record lookup table file. As the user selects a particular entry in the lookup table for access, the CBD may initiate a wireless connection to the GBD file server and retrieve the entry to its cache, thus providing the user with the desired information. All entries retrieved in this manner are cached within the CBD for later access by the user without the need to further access the CBD file server. Additionally, the CBD file server may initiate a wireless connection with the CBD and send "delete" commends to delete the lookup table file or particular record. A cell phone would therefore only have in its CBD those records that the user regularly needs and updates may be performed without great inconvenience to the user.

6. CBD's for Internet Service Providers or Application Service Providers

Internet Service Providers or Application Service Providers may provide CBD's to subscribers to provide services. A CBD may be configured to access the provider's CBD file server to provide software and other services to the customers over the Internet.

For example, a service provider might provide a customer a personal computer equipped with a CBD. The CBD would be pre-configured to use the service provider's CBD file server over the Internet The service provider might pre-install an operating system and some basic applications in the cache of a CBD to shorten the initial download time since internet connections are often much slower than LAN connections.

When the computer is connected to the Internet, the CBD would operate normally, downloading files to its cache and receiving "delete" command as needed, all via the internet. If the user requires a different application or operating system, a request could be made to the service provider and the new application or operating system could be accessed by the user in the manner described herein. Such an application gives the service provider complete control over the content of the CBD because the user has read-only access to the CBD. Thus, the service provider may manage and update a user's system without much difficulty and may create additional revenue by placement of advertisements on the user's computer. Advertisements may also benefit the user by reducing the cost of computer ownership.

Thus, a read-only storage device having a network interface, systems including the device, and methods of distributing files over a network are disclosed. While embodiments of this invention have been shown and described, it would be apparent to those skilled in the art that many more modifications are possible without departing from the inventive concepts herein. The invention, therefore, is not to be restricted except in the spirit of the following claims.

What is claimed is:

1. A storage device for use with a computer having a computer processor, the storage device comprising:
   a device processor local to the computer;
   a computer interface communicably connected to the device processor, wherein the computer interface is adapted to enable communications exclusively between the computer processor and the device processor;
   a network interface communicably connected to the device processor to enable the device processor to communicate over a network, wherein the device processor is adapted to employ the network interface for communications with select file servers to the exclusion of other file servers; and
   a storage means communicably connected to the device processor, the device processor being adapted to have read and write access to the storage means and to regulate access of the computer to the storage means, the device processor being configured to give the computer read-only access to the storage means and to represent to the computer that a plurality of files are available on the storage means, wherein upon receipt of a request from the computer for a file from the plurality of files, the device processor is adapted to sequentially (1) determine whether the file is cached on the storage means and provide the file to the computer on a read-only basis if the file is cached on the storage means, (2) request the file from the select file servers if the file is not cached on the storage means, and if the file is obtainable from the select file servers, cache the obtained file on the storage means and provide the obtained file to the computer on a read-only basis, and (3) return a file unavailable notice to the computer if the file is not cached on the storage means and not obtainable from the select file servers.

2. The storage device of claim 1, wherein the computer is communicably connected to a network server through the network interface.

3. The storage device of claim 1, wherein the storage means comprises random access media.

4. A computer network comprising:
   at least one select file server;
   a network server;
   a computer having a computer processor, communicably connected to the network server, the computer being remotely disposed from the select file server and the network server;
   a storage device communicably connected to the computer and to the select file server, the storage device being local to the computer and comprising a device processor, a computer interface, a network interface, and a storage means, wherein
      the computer interface is adapted to enable communications exclusively between the computer processor and the storage device;
      the device processor is adapted to employ the network interface for communications with the select file server to the exclusion of other file servers;
      the device processor is adapted to have read and write access to the storage means;
      the device processor is configured to regulate access of the computer to the storage means and to give the computer read-only access to the storage means and to represent to the computer that a plurality of files are available on the storage means; and
      upon receipt of a request from the computer for a file from the plurality of files, the device processor is adapted to sequentially (1) determine whether the file is cached on the storage means and provide the file to the computer on a read-only basis if the file is cached on the storage means, (2) request the file from the select file server if the file is not cached on the storage means, and if the file is obtainable from the select file server, cache the obtained file on the storage means and provide the obtained file to the computer on a read-only basis, and (3) return a file unavailable notice to the computer if the file is not cached on the storage means and not obtainable from the select file server.

5. The computer network of claim 4, wherein the computer is communicably connected to the network server through the storage device.

6. The computer network of claim 4, wherein the storage means comprises random access media.

7. A method of providing a file to a computer having a computer processor, the method comprising:
   receiving in a storage device a request from the computer for the file, wherein the storage device is communicably connected to and local to the computer and includes:
      a device processor, a storage means, and
      a computer interface, the computer interface being adapted to enable communications exclusively between the computer processor and the storage device, the device processor being configured to regulate access of the computer to the storage means and to give the computer read-only access to the storage means and the represent to the computer that a plurality of files are available on the storage means;
determining whether the file is cached on the storage means; then determining, if the file is not cached on the storage means, whether the file is available from select file servers, the storage device being adapted to have network communications with the select file servers to the exclusion of other file servers, and if the file is available from the select file servers, retrieving the file from the select file servers and caching the retrieved file on the storage means; then
providing to the computer the file on a read-only basis if the file is cached on the storage means; and
providing to the computer a response indicating that the file is not available if the file is not cached on the storage means.

8. The method of claim 7, further comprising deleting the cached file from the storage means upon receiving a command from the select file servers to delete the cached file.

9. The method of claim 7, further comprising deleting the cached file from the storage means upon receiving notice from the file server that an updated version of the cached file is available.

10. A storage device for use with a computer having a computer processor, the storage device comprising:
a device processor communicably coupled to a computer processor through a computer interface communicably, wherein the computer interface is adapted to enable communications exclusively between the computer processor and the device processor, and the device processor is localized to the computer;
a network interface communicably coupled to the device processor to enable the device processor to communicate over a network, wherein the device processor is adapted to employ the network interface for communications with select file servers to the exclusion of other file servers; and
a storage means communicably connected to the device processor, the device processor being adapted to have read and write access to the storage means and to regulate access of the computer to the storage means, the device processor being configured to give the computer read-only access to the storage means and to represent to the computer that a plurality of files are available on the storage means, wherein upon receipt of a request from the computer for a file from the plurality of files, the device processor is adapted to sequentially (1) determine whether the file is cached on the storage means and provide the file to the computer on a read-only basis if the file is cached on the storage means, (2) request the file from the select file servers if the file is not cached on the storage means, and if the file is obtainable from the select file servers, cache the obtained file on the storage means and provide the obtained file to the computer on a read-only basis, and (3) return a file unavailable notice to the computer if the file is not cached on the storage means and not obtainable from the select file servers.

11. The storage device of claim 10, wherein the computer is communicably connected to a network server through the network interface.

12. The storage device of claim 10, wherein the storage means comprises random access media.

* * * * *